United States Patent
Vitek et al.

(10) Patent No.: US 11,461,992 B2
(45) Date of Patent: Oct. 4, 2022

(54) REGION OF INTEREST SELECTION FOR OBJECT DETECTION

(71) Applicant: SAMSUNG ELECTRONICS CO., LTD., Suwon-si (KR)

(72) Inventors: Ran Vitek, Hasharon (IL); Alexandra Dana, Tel Aviv (IL); Maor Shutman, Tel Aviv (IL); Matan Shoef, Tel Aviv (IL); Yotam Perlitz, Tel Aviv (IL); Tomer Peleg, Kfar Saba (IL); Netanel Stein, Tel Aviv (IL); Roy Josef Jevnisek, Giv'aataim (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 17/095,883

(22) Filed: Nov. 12, 2020

(65) Prior Publication Data
US 2022/0147751 A1 May 12, 2022

(51) Int. Cl.
*G06V 20/58* (2022.01)
*G06V 10/20* (2022.01)
(Continued)

(52) U.S. Cl.
CPC ......... *G06V 10/255* (2022.01); *G06K 9/6261* (2013.01); *G06K 9/6262* (2013.01);
(Continued)

(58) Field of Classification Search
CPC .... G06V 10/255; G06V 20/58; G06K 9/6261; G06K 9/6262; G06K 9/6288
See application file for complete search history.

(56) References Cited

U.S. PATENT DOCUMENTS

| 9,424,462 B2 | 8/2016 | Otsuka et al. |
| 9,697,416 B2 | 7/2017 | Shen et al. |

(Continued)

OTHER PUBLICATIONS

Sun, et al., "ProNet: Learning to Propose Object-specific Boxes for Cascaded Neural Networks", arXiv:1511.03776v3 [cs.CV] Apr. 13, 2016, 9 pages.
Zhao, et al., "ICNet for Real-Time Semantic Segmentation on High-Resolution Images," in European Conference on Computer Vision, 2018, 16 pages.
(Continued)

*Primary Examiner* — Sam Bhattacharya
(74) *Attorney, Agent, or Firm* — F. Chau & Associates, LLC

(57) ABSTRACT

An object detection system may generate regions of interest (ROIs) from an input image that can be processed by a wide range of object detectors. According to the techniques described herein, an image is processed by a light-weight neural network (e.g., a heatmap network) that outputs object center and object scale heat-maps. The heatmaps are processed to define ROIs that are likely to include objects. Overlapping ROIs are then merged to reduce the aggregate size of the ROIs, and merged ROIs are downscaled to a reduced set of pre-defined resolutions. Fully-convolutional, high-accuracy object detectors may then operate on the downscaled ROIs to output accurate detections at a fraction of the computations by operating on a reduced image. For example, fully-convolutional, high-accuracy object detectors may operate on a subset of the entire image (e.g., cropped images based on ROIs) thus reducing computations otherwise performed over the entire image.

20 Claims, 9 Drawing Sheets

(51) Int. Cl.
  *G06K 9/62* (2022.01)
  *B60W 30/09* (2012.01)

(52) U.S. Cl.
  CPC .......... *G06K 9/6288* (2013.01); *G06V 20/58* (2022.01); *B60W 30/09* (2013.01); *B60W 2554/4029* (2020.02)

(56) References Cited

U.S. PATENT DOCUMENTS

| | | | |
|---|---|---|---|
| 10,002,313 B2 | 6/2018 | Vaca Castano et al. | |
| 10,083,352 B1* | 9/2018 | Solh | G06V 40/20 |
| 11,153,503 B1* | 10/2021 | Ebrahimi Afrouzi | H04N 7/183 |
| 2009/0034849 A1* | 2/2009 | Grosvenor | G06T 3/0012 |
| | | | 382/199 |
| 2010/0091330 A1* | 4/2010 | Marchesotti | G06V 10/464 |
| | | | 382/218 |
| 2012/0159329 A1* | 6/2012 | Chow | G11B 27/329 |
| | | | 715/716 |
| 2013/0125039 A1* | 5/2013 | Murata | G06T 11/60 |
| | | | 715/781 |
| 2016/0104055 A1* | 4/2016 | Lin | G06T 3/40 |
| | | | 382/298 |
| 2019/0014149 A1* | 1/2019 | Cleveland | H04L 9/3236 |
| 2019/0018534 A1* | 1/2019 | Holman | G06F 3/014 |
| 2019/0139282 A1* | 5/2019 | Rathore | G06V 10/50 |
| 2019/0329768 A1* | 10/2019 | Shalev-Shwartz | B60W 30/09 |
| 2020/0125238 A1* | 4/2020 | Vadapandeshwara | |
| | | | G06F 9/451 |
| 2021/0056292 A1* | 2/2021 | Mao | G06V 40/171 |
| 2021/0092371 A1* | 3/2021 | Han | G06N 20/00 |
| 2021/0232797 A1* | 7/2021 | Shannon | G06V 40/1312 |
| 2021/0264082 A1* | 8/2021 | Tehranipoor | G06T 7/50 |
| 2021/0271917 A1* | 9/2021 | Xu | G06V 20/10 |
| 2021/0295525 A1* | 9/2021 | Price | G06T 7/13 |
| 2021/0374965 A1* | 12/2021 | Richter | G06T 7/155 |
| 2021/0398333 A1* | 12/2021 | Kalu | G06T 11/60 |

OTHER PUBLICATIONS

Liu, et al., "High-level Semantic Feature Detection: A New Perspective for Pedestrian Detection", in Proceedings of the IEEE Conference on Computer Vision and Pattern Recognition (pp. 5187-5196), 2019.
Girshick, et al. "Rich feature hierarchies for accurate object detection and semantic segmentation", Proceedings of the IEEE conference on computer vision and pattern recognition, 21 pages, 2014.
Ren, et al., "Faster R-CNN: Towards Real-Time Object Detection with Region Proposal Networks", IEEE Trans. Pattern Anal. Mach. Intell., 2017, doi:10.1109/TPAMI.2016.2577031, 6 pages.
Chen, et al., "Supervised Transformer Network for Efficient Face Detection", in European Conference on Computer Vision, 2016, pp. 122-138.
Tan, et al., "EfficientDet: Scalable and Efficient Object Detection", Proceedings of the IEEE/CVF Conference on Computer Vision and Pattern Recognition, 2020, 10 pages.
Huang, et al., "Speed/accuracy trade-offs for modern convolutional object detectors", Proceedings of the IEEE conference on computer vision and pattern recognition, 2017, 21 pages.
Najibi, et al., "AutoFocus: Efficient Multi-Scale Inference", CVF 2019, 11 pages.
Gao, et al., "Dynamic Zoom-in Network for Fast Object Detection in Large Images", CVF 2018, 10 pages.
Lu, et al., "Adaptive Object Detection Using Adjacency and Zoom Prediction", arXiv:1512.07711v2 [cs.CV] Apr. 11, 2016, 9 pages.
Li, et al., "Light-Head R-CNN: In Defense of Two-Stage Object Detector", arXiv:1711.07264v2 [cs.CV] Nov. 23, 2017, 9 pages.
Zhou, et al., "Objects as Points", arXiv:1904.07850v2[cs.CV] Apr. 25, 2019, 6 pages.
Yang, et al., "A Multi-Scale Cascade Fully Convolutional Network Face Detector", arXiv:1609.03536v1 [cs.CV] Sep. 12, 2016, 6 pages.
Song, et al.,"Beyond Trade-off: Accelerate FCN-based Face Detector with Higher Accuracy", CVF 2018, 6 pages.
Angelova, et al., "Real-Time Pedestrian Detection With Deep Network Cascades", 2016, 12 pages.

* cited by examiner

REGION OF INTEREST SELECTION FOR OBJECT DETECTION

BACKGROUND

The following relates generally to object detection, and more specifically to region of interest (ROI) selection for object detection.

Efficient and high-performing neural network processing is becoming important on devices such as computers, smartphones, tablets, and wearables. In some examples, devices may implement specialized neural network processing to perform specialized tasks with increased processing performance and reduced power consumption. For instance, neural network processing may be implanted for various imaging and computer vision applications. Object detection systems are a part of many vision-based applications, such as surveillance cameras, autonomous driving (e.g., pedestrian avoidance applications), etc.

Neural network processing for such applications may be associated with significant computation costs, prohibiting their implementation in power limited systems, systems of limited computational complexity, etc. Further, a trade-off may exist between computation costs (e.g., a number of computations over time, such as floating point operations per second (FLOPS)) and accuracy. Improved object detection techniques may be desired.

SUMMARY

A method, apparatus, non-transitory computer readable medium, and system for region of interest selection for object detection are described. Embodiments of the method, apparatus, non-transitory computer readable medium, and system are configured to receive an image comprising an object to be detected, generate a plurality of cropped images using a heatmap network that outputs a first heatmap indicating a probability that pixels of the image correspond to a center of an object and a second heatmap indicating object scale information, and detect the object by applying an object detection network to each of the cropped images.

An apparatus, system, and method for region of interest selection for object detection are described. Embodiments of the apparatus, system, and method are configured to a heatmap network configured to generate a first heatmap indicating a probability that pixels of the image corresponds to a center of an object and a second heatmap indicating object scale information, a post-processing component configured to generate a plurality of cropped images based on the first heatmap and the second heatmap, and an object detection network configured to detect objects in each of the cropped images.

A method, apparatus, non-transitory computer readable medium, and system for region of interest selection for object detection are described. Embodiments of the method, apparatus, non-transitory computer readable medium, and system are configured to receive training data comprising images and ground truth information for objects in the cropped images, predict a first heatmap indicating a probability that pixels of the images correspond to a center of an object and a second heatmap indicating object scale information, and compute a loss function based on the predicted first heatmap and the predicted second heatmap.

DETAILED DESCRIPTION

Figure 1:
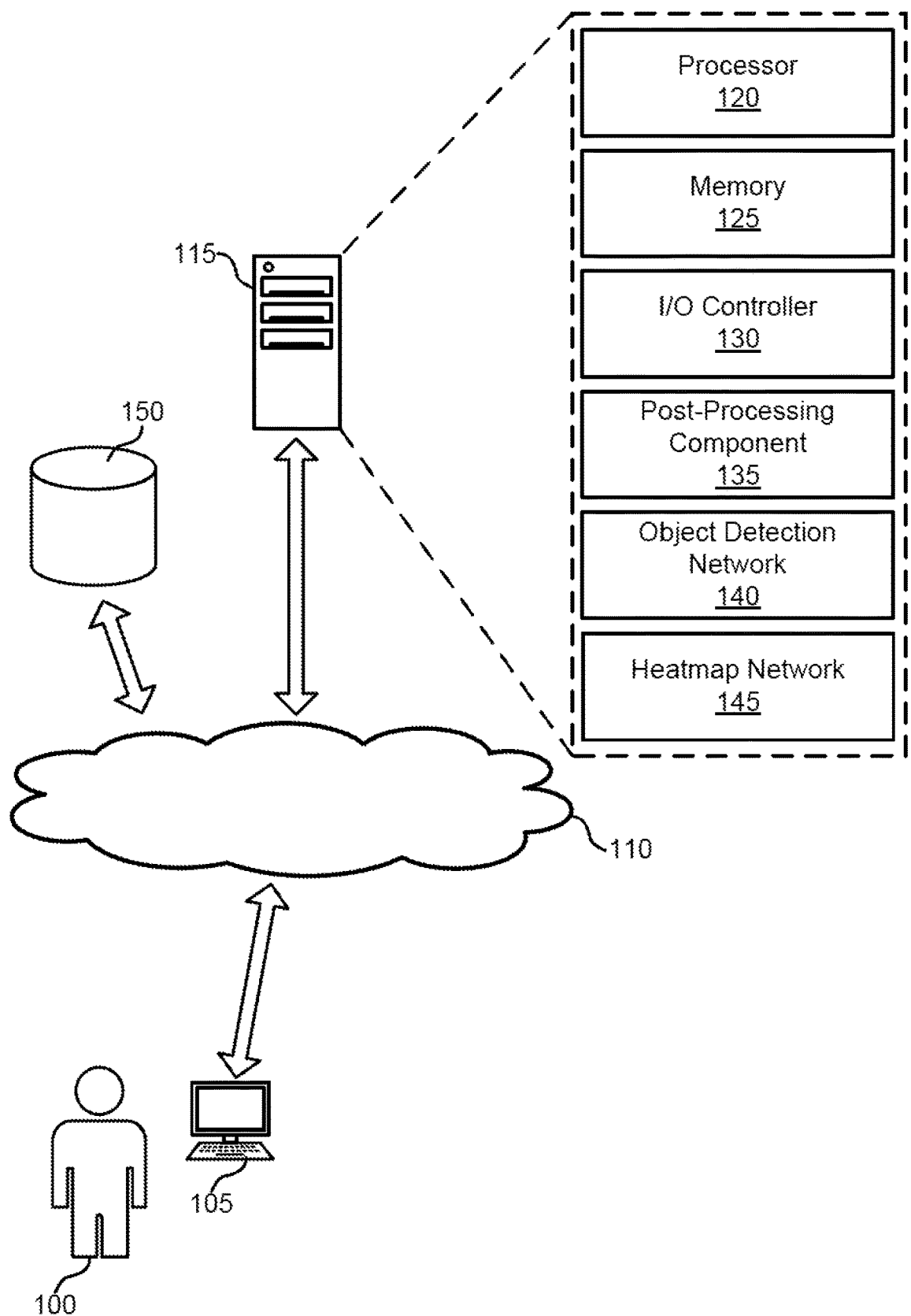
FIG. 1 shows an example of a system for object detection according to aspects of the present disclosure.

Efficient and high-performing neural network processing is becoming important on devices such as computers, smartphones, tablets, and wearables. General computation units such as Computational Processor Units (CPUs), Graphical Processor Units (GPUs) and Neural Processor Units (NPUs) may perform tasks using specific hardware. A Specific Neural Processor (SNP) may be used for neural network processing, where the SNP may execute a specific network (e.g., a specific convolutional neural network (CNN), a specific artificial neural network (ANN), etc.) with high efficiency.

Vision-based applications such as surveillance cameras and autonomous cars use cameras to detect objects. The vision-based applications calculate the movement and locations of the objects and make determinations using the calculations. Vision-based applications, such as autonomous driving applications and surveillance applications, may implement neural network processing (e.g., Neural-Net (NN) based object detectors) to perform such computations. Some object detector algorithms may be associated with high computational complexity or high computation costs (e.g., a large amount computations over time, such as floating point operations per second (FLOPS)). This may prevent implementation of object detector algorithms by power limited (e.g., battery-operated) devices, area-limited system-on-chips (SOCs), etc. For instance, a trade-off may exist between computation costs (e.g., a number of computations over time, FLOPS, etc.) and accuracy (e.g., as FLOPS may be highly correlated with infer time and accuracy). Some devices, such as power limited devices, low complexity or area-limited devices, etc., may not be capable of implementing effective object detector algorithms on real-time on high-resolution images.

A convolutional neural network (CNN) is a class of neural network that is commonly used in computer vision or image classification systems. In some cases, a CNN may enable processing of digital images with minimal pre-processing. Selecting a large number of regions to analyze using conventional CNN techniques may result in computational inefficiencies. Thus, in some cases, object detector algorithms may use region-of-interest (ROI) based processing, where some of the computations may be applied to parts of the image (e.g., some computations may be performed on ROIs of an image rather than the entire image). For instance, in a region-based convolutional neural networks (RCNN) approach, a finite number of proposed regions are selected and analyzed. RCNN & Fast-RCNN both use an algorithm, such as selective search, to generate about 2000 ROIs per image (e.g., making both RCNN & Fast-RCNN impractical for real-time operation of an object detection application). Faster-RCNN uses a neural network to generate ROIs, but Faster-RCNN uses a computation-intensive system since the same features are reused for a final classification and regression. Additionally or alternatively, Faster-RCNN generates a number (e.g., ~100 s) of proposals per image. Therefore, Faster-RCNN based solutions also may not be practical for real-time applications on cost-limited or power-limited devices (e.g., vehicles or mobile devices).

Embodiments of the present disclosure provide an efficient method to generate an image-dependent number of ROIs (e.g., adaptively based on the scene) that can be processed by a wider range of object detectors (e.g., including power limited object detectors, object detectors with area-limited SOCs, etc.). According to the techniques described herein, an image is processed by a light-weight neural network (e.g., a heatmap network) that outputs an object center heatmap and an object scale heat-maps (e.g., a first heatmap indicating a probability that pixels of the image corresponds to a center of an object and a second heatmap indicating object scale information). The heatmaps are processed to define ROIs that are likely to include objects (e.g., the heatmaps are processed to determine probabilities that ROIs include objects).

Overlapping ROIs are then merged to reduce the aggregate size of the ROIs. The merged ROIs are downscaled to a reduced set of pre-defined resolutions. Fully-convolutional, high-accuracy object detectors may then operate on the downscaled ROIs to output accurate detections at a fraction of the computations by operating on a reduced image. For example, fully-convolutional, high-accuracy object detectors may operate on a subset of the entire image (e.g., cropped images based on the generated ROIs) thus reducing computations otherwise performed over the entire input image. Accordingly, the techniques described herein may be implemented for accurate, real-time object detection at a computational load that may be processed by or used in cost-limited or power-limited devices.

FIG. 1 shows an example of a system for object detection according to aspects of the present disclosure. The example shown includes user 100, device 105, cloud 110, server 115, and database 150. A user 100 may use a device 105 that may be in communication with a server 115. In one embodiment, server 115 includes processor 120, memory 125, input/output (I/O) controller 130, post-processing component 135, object detection network 140, and heatmap network 145.

According to the techniques described herein, the system for object detection shown in FIG. 1 may be implemented for accurate, real-time object detection at a computational load that may be processed by or used in cost-limited or power-limited devices (e.g., device 105 may be a cost-limited or power-limited device).

Device 105 may be a personal computer, laptop computer, mainframe computer, palmtop computer, personal assistant, mobile device, or any other suitable processing apparatus. In some cases, a device 105 may include an image sensor. An image sensor may generally include any image reading device or image sensor (e.g., such as a camera or an image scanner) that may optically scan images, including such as text or photographs, and converts them to a digital image. For instance, in autonomous driving applications, device 105 may include an autonomous vehicle that may include an image sensor (e.g., an object detection camera for autonomous driving operations). As another example, in surveillance applications, device 105 may include a security camera that includes an image sensor for capturing surveillance images or video.

A cloud 110 may be a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud networks have functions distributed over multiple locations from central servers. A server (e.g., server 115) is designated an edge server if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

A server 115 provides one or more functions to users 100 that are linked by way of one or more of the various networks. In some cases, the server 115 includes a single microprocessor board, which includes a microprocessor responsible for controlling all aspects of the server 115. In some cases, a server 115 uses microprocessor and protocols to exchange data with other devices 105/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server 115 is configured to send and receive hypertext markup language (HTML) formatted files (e.g., for displaying web pages). In various embodiments, a server 115 comprises a general purpose computing device, a personal computer, a laptop computer, a mainframe computer, a super computer, or any other suitable processing apparatus.

A database 150 is an organized collection of data. For example, a database 150 stores data in a specified format known as a schema. A database 150 may be structured as a single database, a distributed database, multiple distributed databases, or an emergency backup database. In some cases, a database controller may manage data storage and processing in a database 150. In some cases, a user 100 interacts with database 150 (e.g., a database controller). In other cases, a database controller may operate automatically without user 100 interaction.

Software may include code to implement aspects of the present disclosure. Software may be stored in a non-transitory computer-readable medium such as memory 125 (e.g., system memory or other memory). In some cases, the software may not be directly executable by the processor 120 but may cause a computer (e.g., when compiled and executed) to perform functions described herein.

A processor 120 is an intelligent hardware device, (e.g., a general-purpose processing component, a digital signal processor 120 (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 120 is configured to operate memory 125 (e.g., a memory array) using a memory controller. In other cases, a memory controller is integrated into the processor 120. In some cases, the processor 120 is configured to execute computer-readable instructions stored in a memory 125 to perform various functions. In some embodiments, a processor 120 includes special purpose components for modem processing, baseband processing, digital signal processing, or transmission processing.

Examples of memory 125 include random access memory (RAM), read-only memory (ROM), or a hard disk. Examples of memory devices include solid state memory and a hard disk drive. In some examples, memory 125 is used to store computer-readable, computer-executable software including instructions that, when executed, cause a processor 120 to perform various functions described herein. In some cases, the memory 125 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 125 store information in the form of a logical state.

A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. A standard CNN may not be suitable when the length of the output layer is variable, i.e., when the number of the objects of interest is not fixed. Selecting a large number of regions to analyze using conventional CNN techniques may result in computational inefficiencies. Thus, in the R-CNN approach, a finite number of proposed regions are selected and analyzed.

In digital image processing and computer vision, image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. In some examples, image segmentation is the process of assigning a label to every pixel in an image such that pixels with the same label share certain characteristics. In some cases, ROI selection described herein may be referred to as image segmentation.

Down-sampling refers to the process of reducing samples (e.g., sample-rate reduction in a multi-rate digital signal processing system). Down-sampling can include compression and filtering (i.e., decimation). It may be performed on a sequence of samples of a signal (e.g., an image), and may produce an approximation of a sequence obtained by sampling the signal at a lower rate or resolution. Compression may refer to decimation by an integer factor. For instance, decimation by a factor of 10 results in using (e.g., keeping, encoding, sampling, etc.) every tenth sample. The process of compression thus refers to the process of removing data points.

I/O controller 130 may manage input and output signals for a device. I/O controller 130 may also manage peripherals not integrated into a device. In some cases, I/O controller 130 may represent a physical connection or port to an external peripheral. In some cases, I/O controller 130 may utilize an operating system such as iOS®, ANDROID®, MS-DOS®, MS-WINDOWS®, OS/2®, UNIX®, LINUX®, or another known operating system. In other cases, I/O controller 130 may represent or interact with a modem, a keyboard, a mouse, a touchscreen, or a similar device. In some cases, I/O controller 130 may be implemented as part of a processor. In some cases, a device 105 may interact with a server 115 via I/O controller 130 or via hardware components controlled by I/O controller 130.

According to some embodiments, I/O controller 130 receives an image including one or more objects to be detected. In some examples, I/O controller 130 captures the image using a vehicle based camera. That is, I/O controller 130 may include an image sensor itself or may receive image (e.g., image data) from an image sensor that may be a part of device 105.

According to some embodiments, post-processing component 135 generates a set of cropped images using the output of a heatmap network 145 that outputs a first heatmap indicating a probability that pixels of the image correspond to a center of an object and a second heatmap indicating object scale information. In some examples, post-processing component 135 identifies regions of interest in the image based on the first heatmap and the second heatmap, where the cropped images are generated based on the regions of interest. In some examples, post-processing component 135 identifies local maxima in the first heatmap. In other examples, the local maxima are not detected, or the local maxima are used with other techniques to determine the position or location of regions of interest.

In some examples, post-processing component 135 identifies potential duplicate objects. In some examples, post-processing component 135 combines overlapping regions of interest. In some examples, the overlapping regions of interest are combined using a bin packing algorithm. In some examples, post-processing component 135 downscales one or more of the regions of interest, where at least one of the cropped images is based on the downscaling. In some examples, a total number of pixels of the cropped images is less than a number of pixels of the image.

According to some embodiments, post-processing component 135 be configured to generate a plurality of cropped images based on the first heatmap and the second heatmap. In some examples, the post-processing component 135 is configured to identify regions of interest in the image based on the first heatmap and the second heatmap. In some examples, the post-processing component 135 is configured to identify local maxima using a combination of the first heatmap and the second heatmap, identify potential duplicate objects, and combine overlapping regions of interest. In some examples, the post-processing component 135 is configured to downscale one or more of the regions of interest. According to some embodiments, post-processing component 135 performs post-processing on the first heatmap and the second heatmap to produce a set of cropped images. In some examples, post-processing component 135 downscales at least one of the cropped images. Post-processing component 135 is an example of, or includes aspects of, the corresponding element described with reference to FIGS. 2, 4, 6, and 7.

According to some embodiments, object detection network 140 detects the object by applying an object detection network 140 to each of the cropped images. In some examples, object detection network 140 performs real-time automated pedestrian avoidance based on detecting the object. According to some embodiments, object detection network 140 be configured to detect objects in each of the cropped images. According to some embodiments, object detection network 140 applies an object detection network 140 to detect the objects in the cropped images. Object detection network 140 is an example of, or includes aspects of, the corresponding element described with reference to FIGS. 2 and 6.

According to some embodiments, heatmap network 145 is configured with one or more operational parameters of the heatmap network 145 to allow a threshold number of false positives. According to some embodiments, heatmap network 145 be configured to generate a first heatmap indicating a probability that pixels of the image corresponds to a center of an object and a second heatmap indicating object scale information. In some examples, the heatmap network 145 includes a first head configured to produce the first heatmap and a second head configured to produce the second heatmap.

According to some embodiments, heatmap network 145 receives training data including images and ground truth information for objects in the images. In some examples, heatmap network 145 predicts a first heatmap indicating a probability that pixels of the images correspond to a center of an object and a second heatmap indicating object scale information. In some examples, heatmap network 145 computes a loss function based on the predicted first heatmap and the predicted second heatmap. In some examples, heatmap network 145 alternates between predicting the first heatmap and the second heatmap, computing the loss function, and updating the parameters to train the heatmap network 145. In some examples, the first heatmap and the second heatmap are enable an anchor-free technique. In some examples, heatmap network 145 configures one or more operational parameters of the heatmap network 145 to allow a threshold number of false positives. Heatmap network 145 is an example of, or includes aspects of, the corresponding element described with reference to FIGS. 2 and 4.

Embodiments of the present disclosure provide accurate, real-time object detection at a computational load that may be handled by cost-limited or power-limited devices (e.g., which may include device 105). For instance, cost-limited or power-limited devices using off the shelf object detection algorithms (e.g., available object detection networks 140) may perform accurate, real-time object detection at a reduced computational load using ROI selection techniques described herein. The present disclosure provides a reduction in computations for a detector. The algorithm may be used for hardware using, for example, 10 Mgates for 50 ms latency and 30 frames per second (fps) throughput.

A heatmap network 145 (e.g., an object center and scale neural network) may combine a neural network architecture, loss terms, and post-processing. Techniques described herein may include real-time semantic segmentation methods. Embodiments of the present disclosure reduce the resolution of an image in several steps and convert from regular convolutions to separable convolutions. As a result, a number of object detection computations (e.g., FLOPs) are reduced and a super-light neural network (e.g., a light object detection network 140) is achieved.

The present disclosure uses an anchor-free approach providing high flexibility in determining the operating point, tuning the neural network for high coverage (e.g., 99% of the objects). In contrast to high-level semantic feature detection (e.g., center and scale prediction (CSP)), which has similar loss terms, embodiments of the present disclosure post-process the outputs of the neural network, via post-processing component 135, creating a list of proposals or ROIs per image (e.g., less than 20 proposals/ROIs per image). Embodiments of the present disclosure apply a computation-intensive method on the image regions that may contain objects (e.g., ROIs), in contrast to both single-stage detectors and conventional two-stage detectors.

Figure 2:
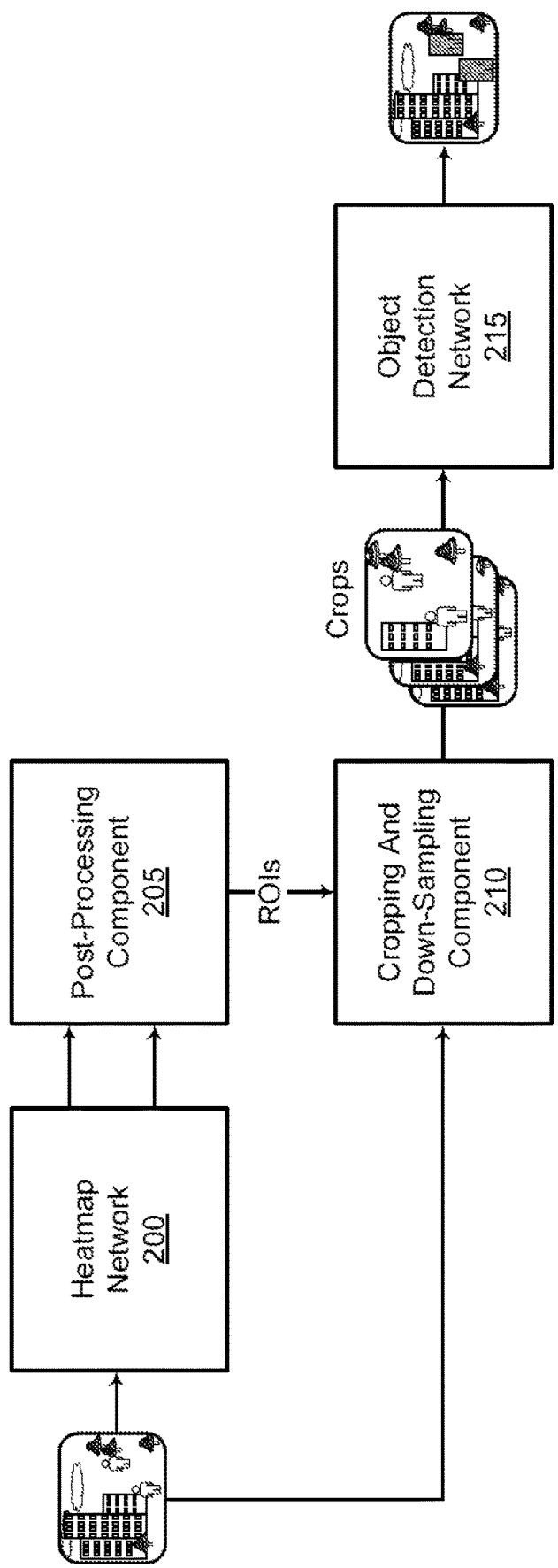
FIG. 2 shows an example of a process for object detection according to aspects of the present disclosure.

FIG. 2 shows an example of a process for object detection according to aspects of the present disclosure. The example shown includes heatmap network 200, post-processing component 205, cropping and down-sampling component 210, and object detection network 215. Heatmap network 200 is an example of, or includes aspects of, the corresponding element described with reference to FIGS. 1, 4, 6, and 7. Post-processing component 205 is an example of, or includes aspects of, the corresponding element described with reference to FIGS. 1, 4, 6, and 7. Object detection network 215 is an example of, or includes aspects of, the corresponding element described with reference to FIGS. 1, 6, and 7.

Embodiments of the present disclosure provide an efficient method to generate an image-dependent number of ROIs that can be processed by an object detector (e.g., object detection network 215). For instance, an image-dependent number of ROIs may be generated as the techniques described herein may be adaptive to the scene captured by the image (e.g., for pedestrian detection, more gain may be achievable when a scene is less crowded). As described herein, the generated ROIs may reduce a number of computations performed by the object detection network 215

(e.g., as the object detection network 215 may perform object detection computations on the generated ROIs rather than the entire image).

To generate (e.g., determine, etc.) ROIs, an image is processed by a light-weight neural network (e.g., heatmap network 200) that outputs objects center and object scale heatmaps. For instance, heatmap network 200 outputs a first heatmap (e.g., an object center heatmap) indicating a probability that pixels of the image correspond to a center of an object and a second heatmap (e.g., an object scale heatmap) indicating object scale information. The first heatmap and second heatmap are processed by post-processing component 205, defining ROIs with a probability that the ROI may contain an object.

Post-processing component 205 and cropping and down-sampling component 210 are configured to generate a plurality of cropped images based on the first heatmap and the second heatmap. Cropping and down-sampling component 210 may manage ROIs generated by post-processing component 205. For instance, overlapping ROIs are merged to reduce the overlapping ROIs aggregated size. The merged ROIs are downscaled to a reduced set of pre-defined resolutions. In some examples, cropping and down-sampling component 210 may downscale one or more ROIs (e.g., and crops may be generated based on any downscaled ROIs). For instance, a ROI may be downscaled if permitted based on the size of the ROI (e.g., if the ROI is large, the ROI may be downscaled). In cases where there are only small ROIs, the ROIs may not be downscaled. In some examples, a total number of pixels of the cropped images is less than a number of pixels of the image (e.g., such that object detection may be performed on a reduced image area to reduce computational complexity at the object detection network 215).

A fully-convolutional, high-accuracy object detector (e.g., object detection network 215) may then operate on the downscaled ROIs to output accurate detections at a fraction of the computations (e.g., as the object detection network 215 operates on a reduced image of generated ROIs). For example, fully-convolutional, high-accuracy object detectors may operate on a subset of the entire image corresponding to generated ROIs determined based on the heatmaps (e.g., the object center heatmap and the object scale heatmap) output by the heatmap network 200. In some examples, objects may be detected using heat maps in an anchor-free technique.

The process for object detection shown in FIG. 2 may be implemented in various systems such as surveillance systems, autonomous vehicle systems, etc. For example, an image may be captured using a vehicle based camera and real-time automated pedestrian avoidance may be performed based on the object detection techniques described herein. In other examples, a surveillance camera may capture images and real-time detection of unauthorized individuals, intruders, etc. may be performed based on the object detection techniques described herein. However, the present disclosure is not limited thereto. Various systems or applications may implement the techniques described herein for improved object detection. For example, object detection network 215 generally may be configured to search for any number of classes or any set of classes. End devices my include object detection network 215 and, by implementing the techniques described herein, may implement object detection algorithms on generated ROIs to reduce the number of computations while maintaining threshold object detection accuracy.

Figure 3:
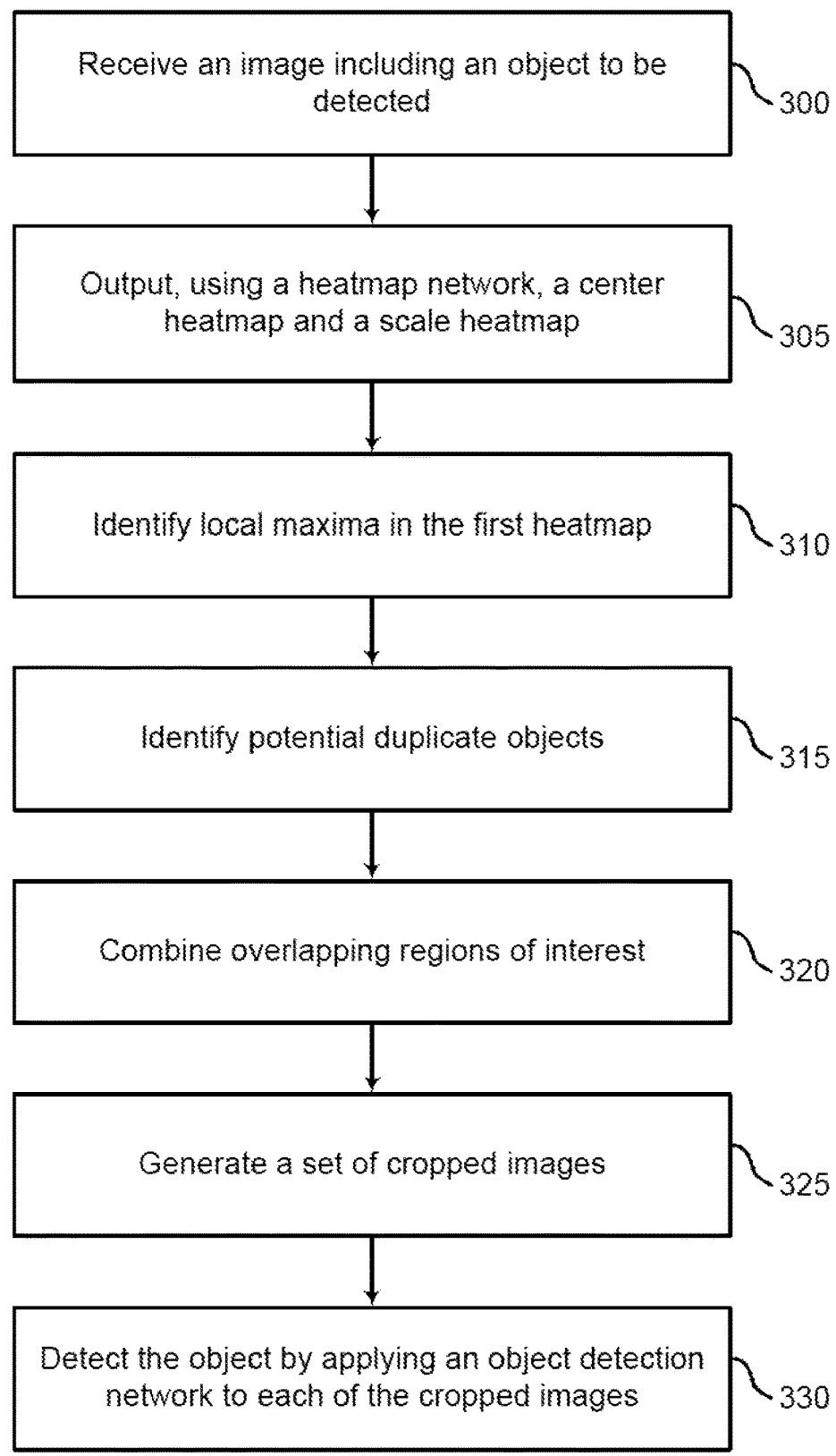
FIG. 3 shows an example of a process for region of interest (ROI) selection for object detection according to aspects of the present disclosure.

FIG. 3 shows an example of a process for ROI selection for object detection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 300, the system receives an image including an object to be detected. In some examples, the image includes multiple objects (e.g., multiple pedestrians) and each of the objects can be detected simultaneously. In some cases, the operations of this step refer to, or may be performed by, an I/O controller as described with reference to FIG. 1.

At operation 305, the system outputs, using a heatmap network, a first heatmap indicating a probability that pixels of the image correspond to a center of an object and a second heatmap indicating object scale information. In some cases, the operations of this step refer to, or may be performed by, a post-processing component as described with reference to FIGS. 1, 2, 4, 6, and 7.

At operation 310, the system identifies local maxima in the first heatmap. In other embodiments, regions of interest may be identified using other methods in addition to, or as an alternative to, identifying local maxima. For example, the scale information can be combined with the center information. In some embodiments, a configuration of filters using both heatmaps may be used to identify regions of interest. In some cases, the operations of this step refer to, or may be performed by, a post-processing component as described with reference to FIGS. 1, 2, 4, 6, and 7.

At operation 315, the system identifies potential duplicate objects. In some cases, the operations of this step refer to, or may be performed by, a post-processing component as described with reference to FIGS. 1, 2, 4, 6, and 7.

At operation 320, the system combines overlapping regions of interest. In some cases, the operations of this step refer to, or may be performed by, a post-processing component as described with reference to FIGS. 1, 2, 4, 6, and 7.

At operation 325, the system generates a set of cropped images based on the combined regions of interest.

At operation 330, the system detects the object by applying an object detection network to each of the cropped images. In some cases, the operations of this step refer to, or may be performed by, an object detection network as described with reference to FIGS. 1, 2, and 6.

Figure 4:
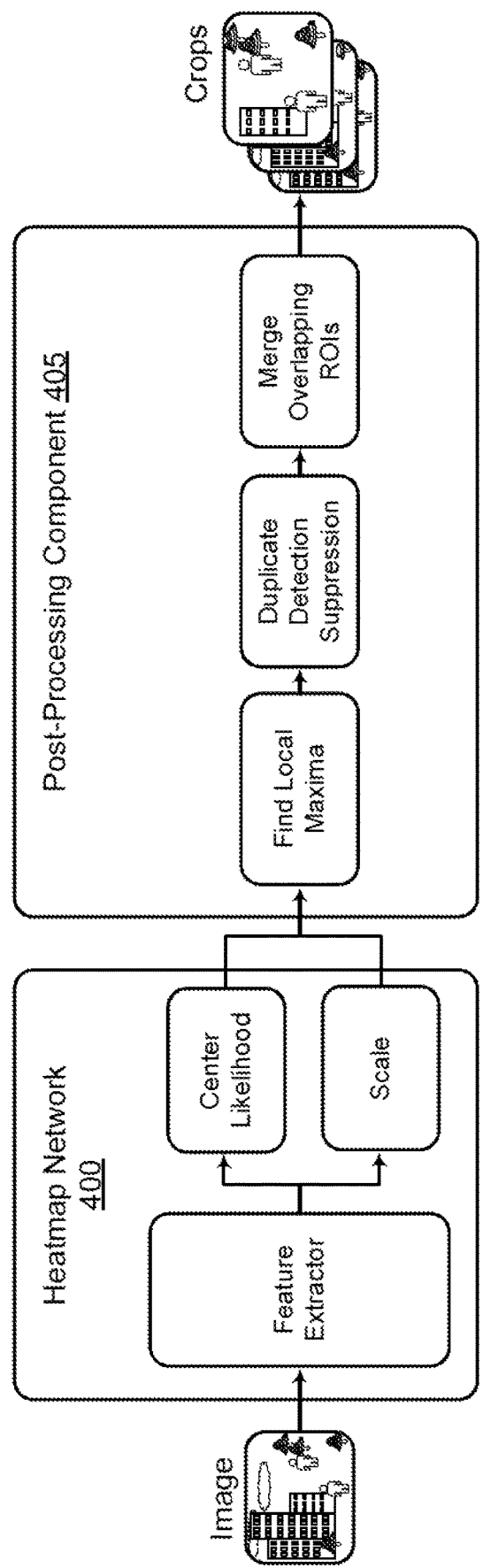
FIG. 4 shows an example of a process for ROI selection according to aspects of the present disclosure.

FIG. 4 shows an example of a process for ROI selection according to aspects of the present disclosure. The example shown includes heatmap network 400 and post-processing component 405. Heatmap network 400 is an example of, or includes aspects of, the corresponding element described with reference to FIGS. 1, 2, 6, and 7. Post-processing component 405 is an example of, or includes aspects of, the corresponding element described with reference to FIGS. 1, 2, 6, and 7.

Embodiments of the present disclosure use a convolutional feature-extraction system and two fully convolutional heads (e.g., detection heads). The fully convolutional heads may include a center likelihood map (e.g., an object center heatmap) and a scale estimation map (e.g., an object scale heatmap). For instance, heatmap network 400 may include a feature extractor that may extract features from an image (e.g., an input image). Heatmap network 400 may then generate a first heatmap indicating a probability that pixels of the image correspond to a center of an object (e.g., center likelihood information) and a second heatmap indicating object scale information (e.g., scale information). In some cases, one or more operational parameters of the heatmap network 400 may be configured to allow a threshold number of false positives.

In some examples, the heatmap network 400 may be trained using training data. For instance, training data may include images and ground truth information for objects in the images. Training the heatmap network 400 may involve supplying values for the input images, and modifying edge weights and activation functions (algorithmically or randomly) until the result closely approximates a set of desired object detection outputs. An object center heatmap and an object scale heatmap may be predicted and a loss function may be computed (e.g., based on the predicted object center heatmap and object scale heatmap. Parameters of the heatmap network 400 (e.g., edge weights) may be updated based on the computed loss function. In some cases, training the heatmap 400 may include alternating between predicting the object center heatmap and the object scale heatmap, computing the loss function, and updating the parameters to train the heatmap network.

Heatmaps generated by heatmap network 400 are then processed by post-processing component 405. For instance, locations of local maxima in the object center heatmap (e.g., the center likelihood map) are considered as object centers. The scale heatmap may also be used for determining object location. The value of the object center heatmap is used as a confidence score. Object characteristics (e.g., object scale, object height, and object width) are determined from the object scale heatmap (e.g., the scale estimation map) at the corresponding locations. Duplicate detections are then identified and suppressed according to the determined distance and a scale difference. Overlapping ROIs may then be merged to generate one or more crops (e.g., one or more cropped images of the initial image that correspond to identified ROIs).

For example, post-processing component 405 identifies ROIs in the image based on the object center heatmap and the object scale heatmap generated by heatmap network 400. Post-processing component 405 may identify local maxima in the object center heatmap, identify potential duplicate objects (e.g., suppress detected duplicate objects), and combine any overlapping ROIs (e.g., merge overlapping ROIs). In some examples, the ROIs are combined using a bin packing algorithm. Cropped images ('Crops') are then generated based on the ROIs (e.g., in cases where the ROIs are downscaled, the cropped images are generated based on the downscaled ROIs).

Figure 5:
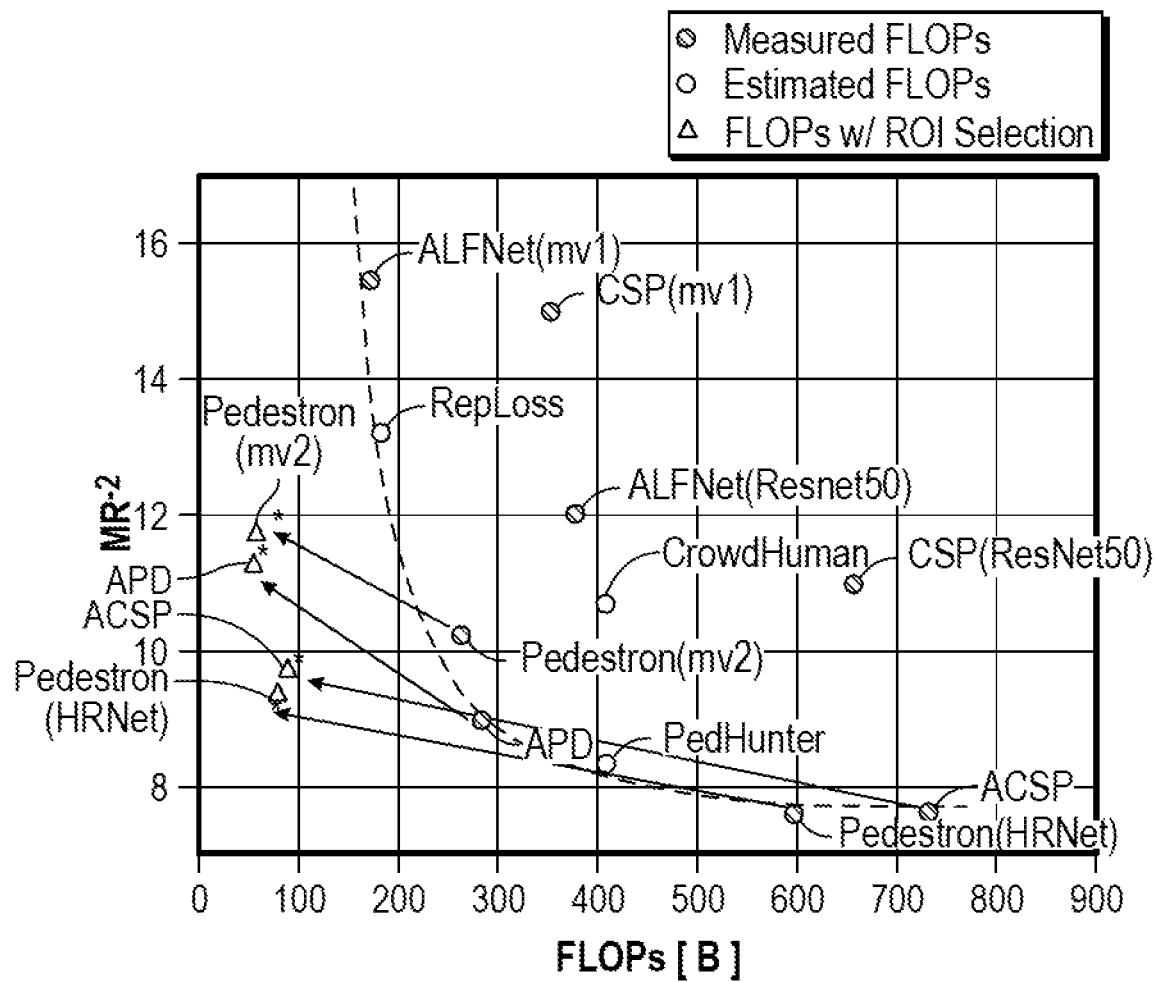
FIG. 5 shows an example of an example of ROI candidate reduction according to aspects of the present disclosure.

FIG. 5 shows an example of an example of using ROI selection techniques to improve the tradeoff between accuracy and efficiency (e.g., computational complexity) according to aspects of the present disclosure. Using the techniques described herein, the number of computations may be reduced (e.g., FLOPS may be reduced) for various object detection networks (e.g., such as ACSP, Pedestron(HRNet), APD, Pedestron(mv2), etc.). For instance, object detection networks may perform object detection on cropped images according to the techniques described herein. Such may reduce the number of computations without overly compromising accuracy (e.g., without significantly increasing $MR^{-2}$). FIG. 5 may thus illustrate the accuracy/computation tradeoff for different object detection networks (e.g., pedestrian detection solutions) and how the accuracy/computation tradeoff is improved using generation of ROIs and cropped images for computations (e.g., as shown by the difference between 'Measured FLOPS' and 'FLOPS w/ROI Selection' for object detection solutions such as ACSP, Pedestron (HRNet), APD, and Pedestron(mv2)).

Figure 6:
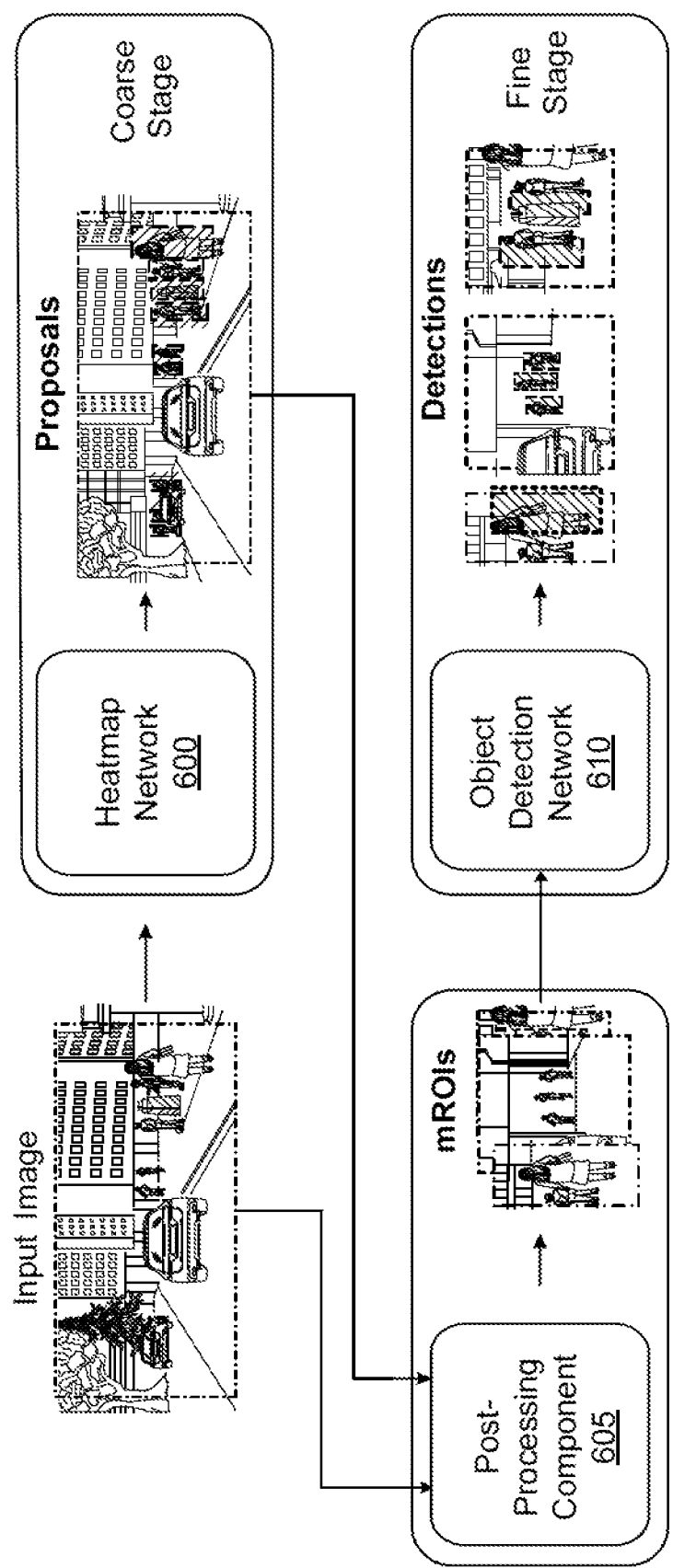
FIG. 6 shows an example of a process for object detection according to aspects of the present disclosure.

FIG. 6 shows an example of a process for object detection according to aspects of the present disclosure. The example shown includes heatmap network 600, post-processing component 605, and object detection network 610. Heatmap network 600 is an example of, or includes aspects of, the corresponding element described with reference to FIGS. 1, 2, 4, and 7. Post-processing component 605 is an example of, or includes aspects of, the corresponding element described with reference to FIGS. 1, 2, 4, and 7. Object detection network 610 is an example of, or includes aspects of, the corresponding element described with reference to FIGS. 1, 2, and 7. In some implementations, heatmap network 600 may be an ultralight pedestrian detector and object detection network 610 may be any accurate pedestrian detector.

The techniques described herein may include coarse-to-fine object detection. For instance, in a first stage (e.g., a coarse stage), heatmap network 600 outputs heatmaps (e.g., an object center heatmap and an object scale heatmap) as initial ROIs from an input image. The input image and the heatmaps are then processed by post-processing component 605. A second stage (e.g., a fine stage) determines ROIs to be passed to object detection network 610 (e.g., such that the object detection network 610 that performs fine searching computations only performs such computations on refined ROIs from post-processing component 605). For instance, post-processing component 605 may refine and merge ROIs (e.g., mROIs) to be passed to object detection network 610, where the object detection network 610 may then performs fine searching computations on the refined ROIs.

Figure 7:
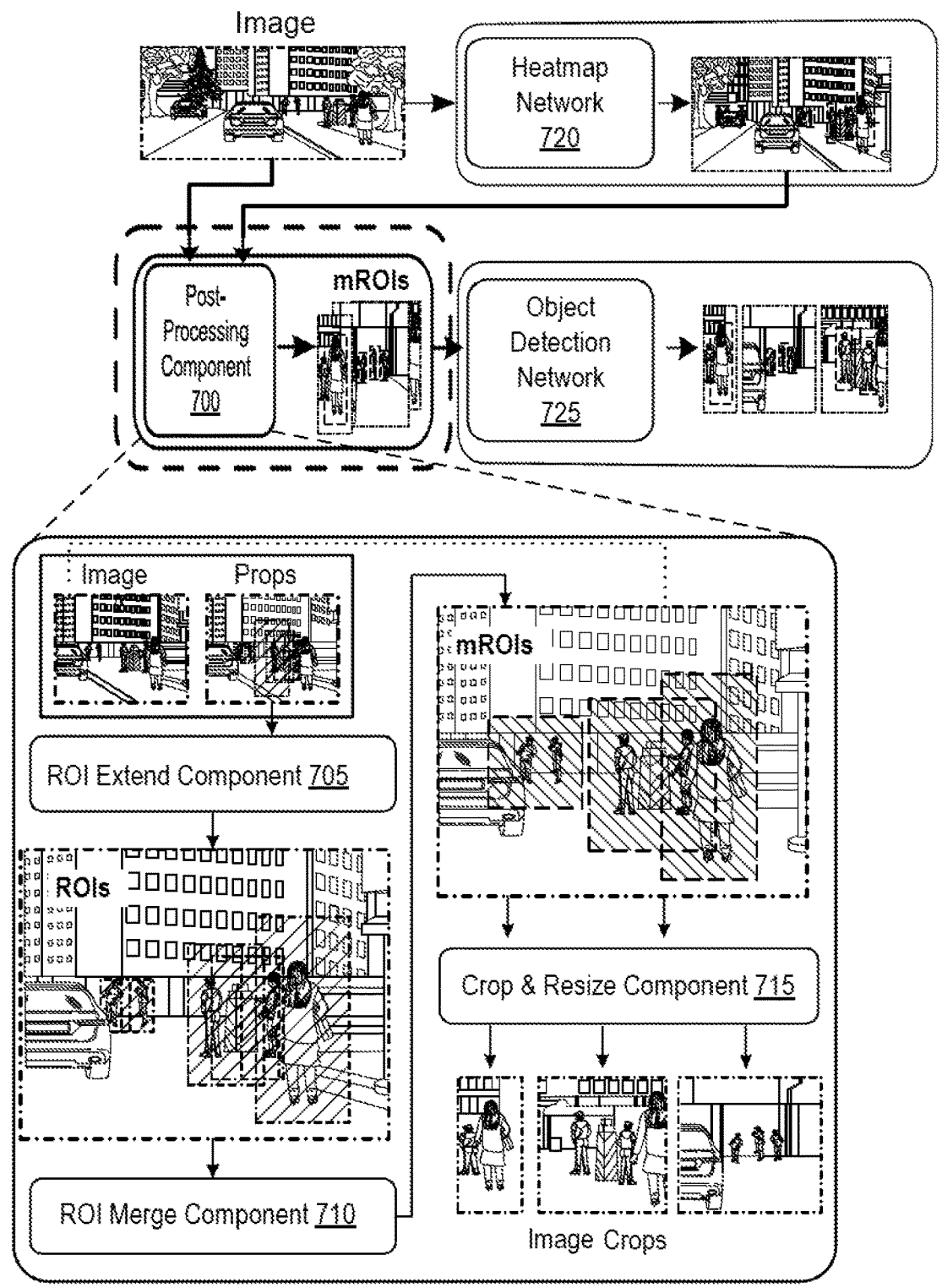
FIG. 7 shows an example of a post-processing component process for ROI selection according to aspects of the present disclosure.

FIG. 7 shows an example of a post-processing component 700 process for ROI selection according to aspects of the present disclosure. The example shown includes post-processing component 700, heatmap network 720, and object detection network 725. Heatmap network 720 is an example of, or includes aspects of, the corresponding element described with reference to FIGS. 1, 2, 4, and 6. Object detection network 725 is an example of, or includes aspects of, the corresponding element described with reference to FIGS. 1, 2, and 6. Post-processing component 700 is an example of, or includes aspects of, the corresponding element described with reference to FIGS. 1, 2, 4, and 6. In one embodiment, post-processing component 700 includes ROI extend component 705, ROI merging component 710, and crop & resize component 715.

As described herein, an image (e.g., an input image) may be passed to a heatmap network 720 (e.g., that may generate an object center heatmap and an object scale heatmap). The image and the heatmaps may then be processed by post-processing component 700, where post-processing component 700 may generate one or more cropped images (e.g., merged ROIs) to be analyzed by object detection network 725 for object detection.

For example, ROI extend component 705 may extend ROIs identified from the heatmaps output by heatmap network 720. ROI merge component may then merge ROIs to provide image ROIs according to the coarse detections from the first stage (e.g., from the coarse detection stage). For instance, overlapping bounding boxes may be merged (e.g., using a variation of a 2D bin packing algorithm) to reduce the number of ROIs processed by the second stage detector (e.g., by the object detection network 725). Based on the merged ROIs, crop & resize component 715 may take crops (e.g., cropped images) from the original input image. In some cases, the crops may be downscaled (e.g., to a height of 256 pixels). Object detection network 725 (e.g., a fully-convolutional object detector) can then process these image crops.

Figure 8:
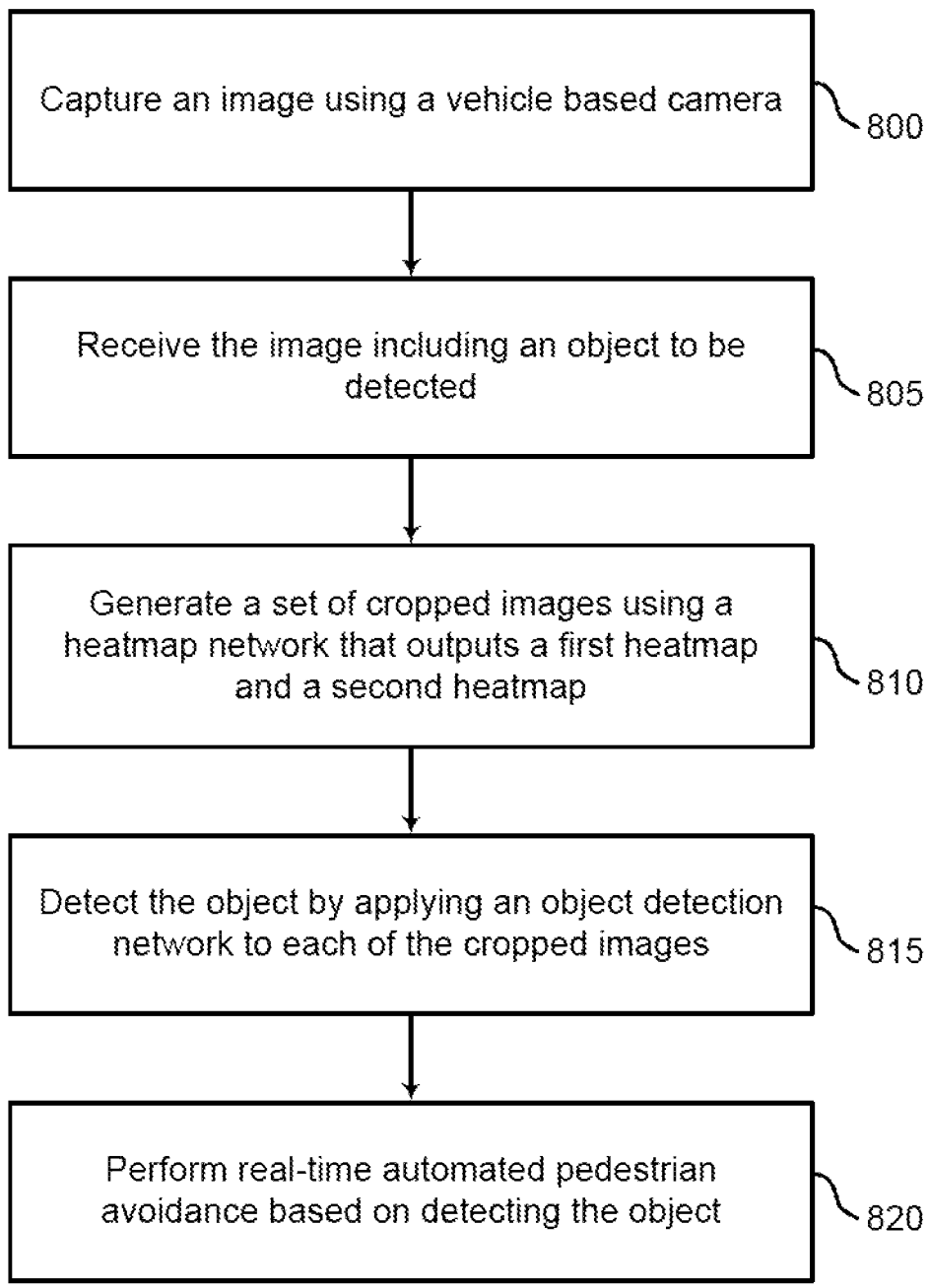
FIGS. 8 through 9 show examples of a process for ROI selection for object detection according to aspects of the present disclosure.

FIG. 8 shows an example of a process for ROI selection for object detection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system captures an image using a vehicle based camera. In some cases, the operations of this step refer to, or may be performed by, an I/O controller as described with reference to FIG. 1.

At operation 805, the system receives the image including one or more objects to be detected. In some cases, the operations of this step refer to, or may be performed by, an I/O controller as described with reference to FIG. 1.

At operation 810, the system generates a set of cropped images using a heatmap network that outputs a first heatmap indicating a probability that pixels of the image correspond to a center of an object and a second heatmap indicating object scale information. In some cases, the operations of this step refer to, or may be performed by, a post-processing component as described with reference to FIGS. 1, 2, 4, 6, and 7.

At operation 815, the system detects the object by applying an object detection network to each of the cropped images. In some cases, the operations of this step refer to, or may be performed by, an object detection network as described with reference to FIGS. 1, 2, and 6.

At operation 820, the system performs real-time automated pedestrian avoidance based on detecting the objects. In some cases, the operations of this step refer to, or may be performed by, an object detection network as described with reference to FIGS. 1, 2, and 6.

Figure 9:
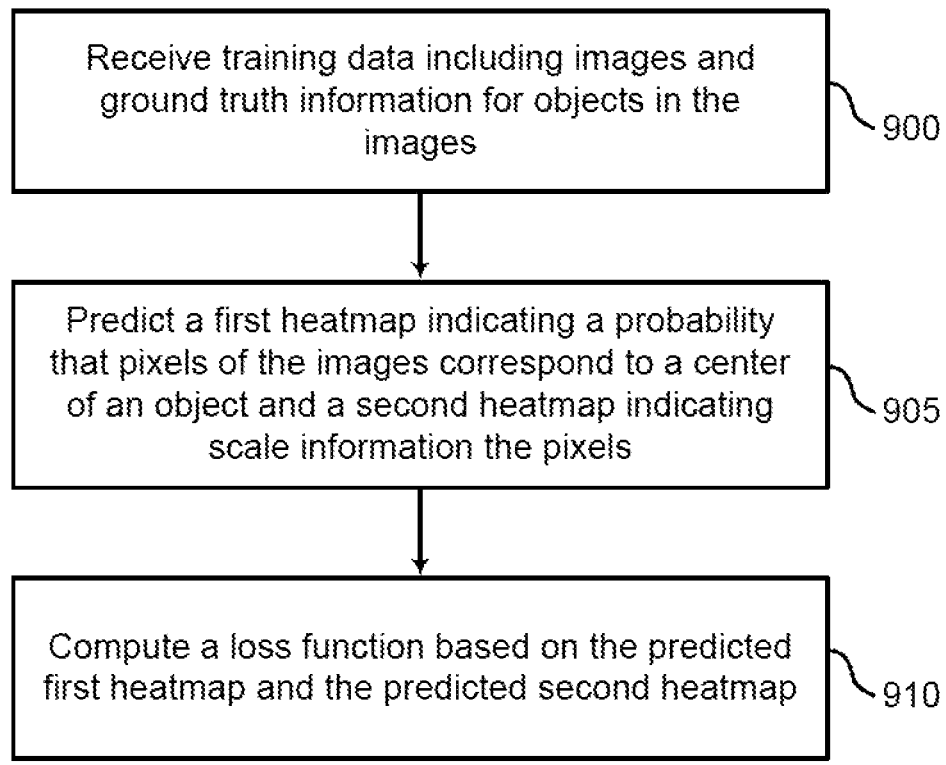

FIG. 9 shows an example of a process for ROI selection for object detection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system receives training data including images and ground truth information for objects in the images. In some cases, the operations of this step refer to, or may be performed by, a heatmap network as described with reference to FIGS. 1, 2, and 4.

At operation 905, the system predicts a first heatmap indicating a probability that pixels of the images correspond to a center of an object and a second heatmap indicating object scale information. In some cases, the operations of this step refer to, or may be performed by, a heatmap network as described with reference to FIGS. 1, 2, and 4.

At operation 910, the system computes a loss function based on the predicted first heatmap and the predicted second heatmap. In some cases, the operations of this step refer to, or may be performed by, a heatmap network as described with reference to FIGS. 1, 2, and 4.

Accordingly, the present disclosure includes the following embodiments.

A method for region of interest selection for object detection is described. Embodiments of the method are configured to receiving an image comprising an object (or objects) to be detected, generating a plurality of cropped images using a heatmap network that outputs a first heatmap indicating a probability that pixels of the image correspond to a center of an object and a second heatmap indicating object scale information, and detecting the objects by applying an object detection network to each of the cropped images.

An apparatus for region of interest selection for object detection is described. The apparatus includes a processor, memory in electronic communication with the processor, and instructions stored in the memory. The instructions are operable to cause the processor to receive an image comprising an object to be detected, generate a plurality of cropped images using a heatmap network that outputs a first heatmap indicating a probability that pixels of the image correspond to a center of an object and a second heatmap indicating object scale information, and detect the object by applying an object detection network to each of the cropped images.

A non-transitory computer readable medium storing code for region of interest selection for object detection is described. In some examples, the code comprises instructions executable by a processor to: receive an image comprising an object to be detected, generate a plurality of cropped images using a heatmap network that outputs a first heatmap indicating a probability that pixels of the image correspond to a center of an object and a second heatmap indicating object scale information, and detect the object by applying an object detection network to each of the cropped images.

A system for region of interest selection for object detection is described. Embodiments of the system are configured to receiving an image comprising an object to be detected, generating a plurality of cropped images using a heatmap network that outputs a first heatmap indicating a probability that pixels of the image correspond to a center of an object and a second heatmap indicating object scale information, and detecting the object by applying an object detection network to each of the cropped images.

Some examples of the method, apparatus, non-transitory computer readable medium, and system described above further include identifying regions of interest in the image based on the first heatmap and the second heatmap, wherein the cropped images are generated based on the regions of interest. Some examples of the method, apparatus, non-transitory computer readable medium, and system described above further include identifying local maxima in the first heatmap. Some examples further include identifying potential duplicate objects. Some examples further include combining overlapping regions of interest. In some examples, the overlapping regions of interest are combined using a bin packing algorithm. Some examples of the method, apparatus, non-transitory computer readable medium, and system described above further include downscaling one or more of the regions of interest, wherein at least one of the cropped images is based on the downscaling.

Some examples of the method, apparatus, non-transitory computer readable medium, and system described above further include configuring one or more operational parameters of the heatmap network to allow a threshold number of false positives. Some examples of the method, apparatus, non-transitory computer readable medium, and system described above further include capturing the image using a vehicle based camera. Some examples further include performing real-time automated pedestrian avoidance based on detecting the object. In some examples, a total number of pixels of the cropped images is less than a number of pixels of the image.

An apparatus for region of interest selection for object detection is described. Embodiments of the apparatus are configured to a heatmap network configured to generate a first heatmap indicating a probability that pixels of the image corresponds to a center of an object and a second heatmap indicating object scale information, a post-processing component configured to generate a plurality of cropped images based on the first heatmap and the second heatmap, and an object detection network configured to detect objects in each of the cropped images.

An system for region of interest selection for object detection, comprising: a heatmap network configured to generate a first heatmap indicating a probability that pixels of the image corresponds to a center of an object and a second heatmap indicating object scale information, a post-processing component configured to generate a plurality of cropped images based on the first heatmap and the second heatmap, and an object detection network configured to detect objects in each of the cropped images.

A method of manufacturing an apparatus for region of interest selection for object detection is described. The method includes a heatmap network configured to generate a first heatmap indicating a probability that pixels of the image corresponds to a center of an object and a second heatmap indicating object scale information, a post-processing component configured to generate a plurality of cropped images based on the first heatmap and the second heatmap, and an object detection network configured to detect objects in each of the cropped images.

A method of using an apparatus for region of interest selection for object detection is described. The method includes a heatmap network configured to generate a first heatmap indicating a probability that pixels of the image corresponds to a center of an object and a second heatmap indicating object scale information, a post-processing component configured to generate a plurality of cropped images based on the first heatmap and the second heatmap, and an object detection network configured to detect objects in each of the cropped images.

In some examples, the heatmap network comprises a first head configured to produce the first heatmap and a second head configured to produce the second heatmap. In some examples, the post-processing component is configured to identify regions of interest in the image based on the first heatmap and the second heatmap. In some examples, the post-processing component is configured to identify local maxima using a combination of the first heatmap and the second heatmap, identify potential duplicate objects, and combine overlapping regions of interest. In some examples, the post-processing component is configured to downscale one or more of the regions of interest.

A method for region of interest selection for object detection is described. Embodiments of the method are configured to receiving training data comprising images and ground truth information for objects in the images, predicting a first heatmap indicating a probability that pixels of the images correspond to a center of an object and a second heatmap indicating object scale information, and computing a loss function based on the predicted first heatmap and the predicted second heatmap.

An apparatus for region of interest selection for object detection is described. The apparatus includes a processor, memory in electronic communication with the processor, and instructions stored in the memory. The instructions are operable to cause the processor to receive training data comprising images and ground truth information for objects in the images, predict a first heatmap indicating a probability that pixels of the images correspond to a center of an object and a second heatmap indicating object scale information, and compute a loss function based on the predicted first heatmap and the predicted second heatmap.

A non-transitory computer readable medium storing code for region of interest selection for object detection is described. In some examples, the code comprises instructions executable by a processor to: receive training data comprising images and ground truth information for objects in the images, predict a first heatmap indicating a probability that pixels of the images correspond to a center of an object and a second heatmap indicating object scale information, and compute a loss function based on the predicted first heatmap and the predicted second heatmap.

A system for region of interest selection for object detection is described. Embodiments of the system are configured to receiving training data comprising images and ground truth information for objects in the images, predicting a first heatmap indicating a probability that pixels of the images correspond to a center of an object and a second heatmap indicating object scale information, and computing a loss function based on the predicted first heatmap and the predicted second heatmap.

Some examples of the method, apparatus, non-transitory computer readable medium, and system described above further include alternating between predicting the first heatmap and the second heatmap, computing the loss function, and updating the parameters to train the heatmap network. In some examples, the first heatmap and the second heatmap are enable an anchor-free technique.

Some examples of the method, apparatus, non-transitory computer readable medium, and system described above further include performing post-processing on the first heatmap and the second heatmap to produce a plurality of cropped images. Some examples of the method, apparatus, non-transitory computer readable medium, and system described above further include downscaling at least one of the cropped images.

Some examples of the method, apparatus, non-transitory computer readable medium, and system described above further include applying an object detection network to detect the objects in the cropped images. Some examples of the method, apparatus, non-transitory computer readable medium, and system described above further include configuring one or more operational parameters of the heatmap network to allow a threshold number of false positives.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise RAM, ROM, electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for object detection, comprising:
receiving an image comprising an object to be detected;
generating, using a heatmap network, a first heatmap indicating a probability that each pixel of the image corresponds to a center of an object and a second heatmap indicating object scale information;
identifying a local maximum of the first heatmap as a center of the object;
identifying a scale of the object based on the scale information of the second heatmap corresponding to the local maximum of the first heatmap;
generating a region of interest for the object using the local maximum from the first heatmap as the center of the object and the scale of the object from the second heatmap;
generating a cropped image based on the region of interest; and
detecting the object in the image by applying an object detection network to a cropped image.

2. The method of claim 1, further comprising:
identifying regions of interest in the image based on the first heatmap and the second heatmap, wherein the cropped images are generated based on the regions of interest.

3. The method of claim 1, further comprising:
identifying the local maximum in the first heatmap;
identifying potential duplicate objects; and
combining overlapping regions of interest.

4. The method of claim 3, wherein:
the overlapping regions of interest are combined using a bin packing algorithm.

5. The method of claim 1, further comprising:
downscaling one or more of the regions of interest, wherein at least one of the cropped images is based on the downscaling.

6. The method of claim 1, further comprising:
configuring one or more operational parameters of the heatmap network to allow a threshold number of false positives.

7. The method of claim 1, further comprising:
capturing the image using a vehicle based camera; and
performing real-time automated pedestrian avoidance based on detecting the object.

8. The method of claim 1, wherein:
a total number of pixels of the cropped images is less than a number of pixels of the image.

9. An apparatus for object detection, comprising:
a heatmap network configured to generate a first heatmap indicating a probability that each pixel of an image corresponds to a center of an object and a second heatmap indicating object scale information;
a post-processing component configured to identify a local maximum of the first heatmap as a center of the object, identify a scale of the object based on the scale information of the second heatmap corresponding to the local maximum of the first heatmap, generate a region of interest for the object using the local maximum from the first heatmap as the center of the object and the scale of the object from the second heatmap, and generate a cropped image based on the region of interest; and
an object detection network configured to detect an object in the image in each of the cropped images.

10. The apparatus of claim 9, wherein:
the heatmap network comprises a first head configured to produce the first heatmap and a second head configured to produce the second heatmap.

11. The apparatus of claim 9, wherein:
the post-processing component is configured to identify regions of interest in the image based on the first heatmap and the second heatmap.

12. The apparatus of claim 9, wherein:
the post-processing component is configured to identify local maximum using a combination of the first heatmap and the second heatmap, identify potential duplicate objects, and combine overlapping regions of interest.

13. The apparatus of claim 9, wherein:

the post-processing component is configured to downscale one or more regions of interest.

14. A method for object detection, comprising:

receiving training data comprising images and ground truth information for objects in the images;

predicting a first heatmap indicating a probability that each pixel of the image corresponds to a center of an object and a second heatmap indicating object scale information; and computing a loss function based on the predicted first heatmap and the predicted second heatmap.

15. The method of claim 14, further comprising:

alternating between predicting the first heatmap and the second heatmap, computing the loss function, and updating one or more operational parameters to train a heatmap network.

16. The method of claim 14, wherein:

the first heatmap and the second heatmap enable an anchor-free technique.

17. The method of claim 14, further comprising:

performing post-processing on the first heatmap and the second heatmap to produce a plurality of cropped images.

18. The method of claim 17, further comprising:

downscaling at least one of the cropped images.

19. The method of claim 14, further comprising:

applying an object detection network to detect the objects in the cropped images.

20. The method of claim 14, further comprising:

configuring one or more operational parameters of a heatmap network to allow a threshold number of false positives.

\* \* \* \* \*